Patented June 4, 1929.

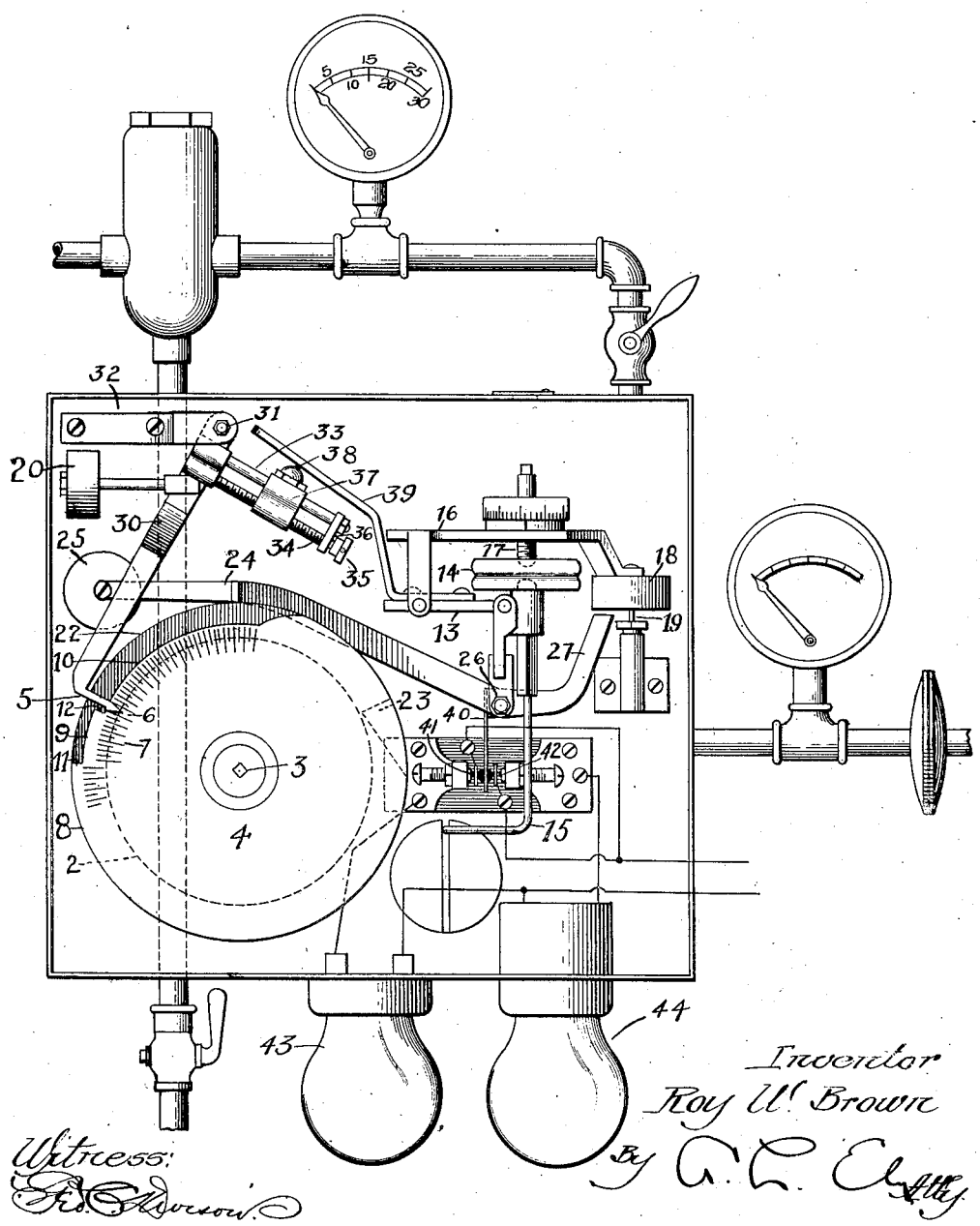

1,715,987

UNITED STATES PATENT OFFICE.

ROY W. BROWN, OF AKRON, OHIO, ASSIGNOR TO THE FIRESTONE TIRE AND RUBBER COMPANY, OF AKRON, OHIO, A CORPORATION OF OHIO.

TIME TEMPERATURE CONTROLLER.

Application filed April 16, 1923. Serial No. 632,522.

This invention relates to improvements in time-temperature controllers for use in producing predetermined conditions of temperature automatically within predetermined periods of time.

Briefly stated, the invention comprehends certain improvements in the structural features of a standard type of mechanism that is commonly used for controlling temperatures automatically, whereby certain controlling elements which vary structurally in different systems may be interchanged from one system to another without detracting from the accuracy of the systems, a feature which has not heretofore been possible.

The invention is also directed toward the provision of novel mechanism whereby the predetermined changes in temperature are substantially instantaneous, a feature which is a marked improvement over the standard structure where the changes are gradual.

A further feature of the invention consists in means for automatically indicating the stage to which the operation has progressed.

For a more complete understanding of this invention, together with further objects and advantageous details and combination of parts, reference may be had to the accompanying drawings illustrating an embodiment thereof in which The figure is a front elevation with the hinged door removed.

The general features of the type of time-temperature controller herein shown are of standard structure. Only such portions of the illustrated instrument, therefore, as are intimately related to the novel features of this invention will be described herein in detail, and for further information as to the details of construction, reference may be had to the standard machines.

In its general aspects the instrument includes a clockwork 2, of conventional form, the spindle 3 of which carries a cam 4, which is instrumental in effecting the changes in temperature at a predetermined time automatically. A rider 5 is adapted to bear constantly upon the periphery of the cam 4. The end of the rider is in the shape of a pointer 6 which acts in conjunction with a scale 7 upon the front face of cam 4 to indicate time intervals. The rider 5 is connected, through an arrangement of parts to be described in detail later, to a lever 13 at the pivoted end of which is mounted a capsular spring or diaphragm 14. The capsular spring is connected through the medium of capillary tube 15 with a thermostatic bulb (not shown), the bulb extending into the apparatus that is to be automatically controlled. An auxiliary lever 16, mounted upon the lever 13, carries an adjusting screw 17 which is kept in contact with the capsular spring by means of a weight 18. The adjusting screw is provided with an indicating dial for changing the temperature setting.

At the start of the process, the cam 4 is set in proper position so that the rider 5 is at the zero point of the dial. The supply of steam is then turned on by the opening of a hand valve. When the temperature within the apparatus reaches the degree called for at the beginning of the process, the capsular spring expands and exerts a pressure against the adjusting screw 17, thereby moving auxiliary lever 16 away from an air valve stem 19, thus shutting a diaphragm valve on the steam inlet.

The above mentioned general features of the construction and operation of the instrument differ in no essential respect from the standard machines, and in view of the fact that they constitute "per se" no part of the applicant's invention require no further description.

It is the shape of the cam and the connection between the rider and the capsular spring to which this invention is primarily directed, the construction of which will now be described in detal.

The cam 4 is provided with a plurality of peripheral surfaces 8, 9 and 10 which are concentrically struck about a common center, but having the radius of each successively shorter. The face of the shoulder 11 and 12 between the surfaces 8 and 9 and 9 and 10 are substantially perpendicular to the peripheral surfaces. By this construction, when the rider has traversed the surface 8, due to the rotation of the cam 4, and the time for a change in temperature has arrived, the rider drops suddenly to the surface 9, due to the action of a weight 20. This fall of the rider, through a connection to be described more fully later, causes the lever 16 to move toward the air valve stem 19 and thus tending to open the diaphragm valve on the steam inlet and causing the temperature to rise. Since the break between the surfaces 8 and 9 is sharp, the change in the temperature is practically instantaneously produced instead of gradually rising, a condition which follows the use of a cam having the effective surfaces connected by a gradually upwardly inclined surface.

In addition to the cam 4, a second cam 22 is mounted upon the spindle 3 and is secured to the cam 4, the two cams being rotatable as a unit in a counter clockwise direction by the clock-work previously mentioned. The periphery of cam 22 is notched out as at 23, affording a sharp break in the cam surface. A cut-off lever 24 is held in constant engagement with the cam surface by means of weight 25. The lever 24 is pivoted at 26 and is provided with a tail 27 extending upwardly and adapted to engage and raise the weight 18 carried by the lever 16 at a predetermined time in the process. The cam 22 is so positioned circumferentially with respect to cam 4 that the lever 24 will fall into the notch 23 when the time allowed for the complete operation has expired. This movement of the lever raises the weight 18 and the lever 16 away from the air valve stem 19, thus shutting off the diaphragm valve on the steam inlet.

I will now describe the novel mechanism by which the rider 5 is connected to the capsular spring. The rider 5 is carried by a lever 30 pivoted at 31 upon a bracket 32. Upon the pivoted end of the lever 30 is mounted a guide rod 33 extending perpendicular to the said lever. Below the guide rod 33 and parallel thereto, is a screw-threaded member 34, mounted for turning movement at its inner end in the lever 30, but restrained against longitudinal movement. The screw 34 is provided with a head 35 upon its outer end in order to facilitate turning thereof. The rod 33 and screw 34 are connected at their outer ends by a link 36. A slidable block 37 is provided with a lower threaded opening through which the screw 34 extends and an upper opening parallel thereto to receive the guide rod 33. In the above construction it is evident that the position of the block relative to the lever 20 can be adjusted by turning the screw 34 by means of the head 35. The block 37 is provided with a pointed surface 38 which contacts with a lever 39 securely attached to the main lever 13 previously described.

It is thus evident that by shifting the slidable block 37, the linking ratio between the lever 30 carrying the rider and the lever 13 connected with the capsular spring is adjustable as may be necessary or desirable. This adjustment permits the use of the same cams or the same capsular spring upon different instruments, a thing heretofore impossible on standard machines, and at the same time secures accurate results. It is practically impossible to manufacture two capsular springs which will expand exactly the same amount when the thermostatic bulbs are subjected to the same temperature. By way of example, when the bulbs in two instruments are both subjected to a temperature of 50°, the capsular in one may expand .030 while the other will expand .040. With the variance in expansion, it has been necessary, in standard machines, to use the original diaphragm with the original cam as the connections between the two have been incapable of adjustment. However, by the use of the connection illustrated by the applicant, the difference in expansion can be easily and accurately taken care of by changing the linking ratio between the levers.

It is desirable in instruments of the type illustrated to provide an indicating device which will automatically show to the operator the stages to which the operation has progressed. For this purpose the lever 24 carries a contact plate 40 which is shiftable into engagement with one of two contact points 41 and 42. When the lever 24 is traveling upon the concentric portion of the cam 22, the contact plate is in engagement with the contact point 41, thus completing an electric circuit and causing a blue electric bulb 43 to be illuminated. When, however, the lever 24 falls into the notch 23, a circuit including a red bulb 44 is completed.

From the foregoing description, it is evident that the operator can determine at a glance the stage to which the operation has progressed, the blue light indicating that the process is continuing, the red light that it has been completed.

Since the manner in which the different parts of the instrument operate to perform their functions and the sequence of the operations as a whole have been set forth in connection with the detailed description of the instrument, no further description of the operation is necessary for an understanding of the invention.

What I claim is:

A time-temperature controller having in combination, means for controlling a valve or a supply of heating fluid, a cam for actuating the controlling means to produce a substantially instantaneous rise in temperature at a predetermined point, and a second cam for causing the controlling means to close the valve.

ROY W. BROWN.